(12) United States Patent
Matsumoto et al.

(10) Patent No.: US 8,795,526 B2
(45) Date of Patent: Aug. 5, 2014

(54) HOLLOW FIBER MEMBRANE ELEMENT, FRAME FOR HOLLOW FIBER MEMBRANE ELEMENT, AND MEMBRANE FILTRATION APPARATUS

(75) Inventors: Hiroshi Matsumoto, Otsu (JP); Masaki Iwanaga, Otsu (JP)

(73) Assignee: Toray Industries, Inc., Tokyo (JP)

( * ) Notice: Subject to any disclaimer, the term of this patent is extended or adjusted under 35 U.S.C. 154(b) by 354 days.

(21) Appl. No.: 12/865,518

(22) PCT Filed: Dec. 25, 2008

(86) PCT No.: PCT/JP2008/073533
§ 371 (c)(1),
(2), (4) Date: Jul. 30, 2010

(87) PCT Pub. No.: WO2009/096131
PCT Pub. Date: Aug. 6, 2009

(65) Prior Publication Data
US 2010/0320137 A1    Dec. 23, 2010

(30) Foreign Application Priority Data
Jan. 31, 2008   (JP) ................. 2008-020710

(51) Int. Cl.
*B01D 61/18* (2006.01)
*B01D 63/04* (2006.01)
*B01D 65/02* (2006.01)
*C02F 1/44* (2006.01)

(52) U.S. Cl.
CPC ............. *B01D 63/046* (2013.01); *B01D 61/18* (2013.01); *B01D 65/02* (2013.01); *B01D 2313/21* (2013.01); *B01D 2313/06* (2013.01); *B01D 2315/06* (2013.01); *B01D 2313/125* (2013.01); *B01D 2313/025* (2013.01); *C02F 1/444* (2013.01); *B01D 2321/18* (2013.01)

USPC ............. 210/321.89; 210/323.2; 210/321.69; 210/236; 210/473; 210/541

(58) Field of Classification Search
CPC ...... B01D 63/02; B01D 63/024; B01D 63/04; B01D 63/043; B01D 63/046; B01D 2315/06; B01D 2313/02; B01D 2313/025; B01D 2313/06; B01D 2313/10; B01D 2313/105; B01D 2313/12; B01D 2313/125; B01D 2313/13; B01D 2313/20; B01D 2313/21; B01D 2313/44; B01D 2313/54; B01D 2313/56; B01D 61/18; B01D 65/02; B01D 2321/18; C02F 1/444

USPC ............. 210/321.8, 321.89, 323.2, 447, 454, 210/459, 473, 474, 500.23, 650, 462, 541, 210/321.78, 321.79, 321.81, 321.87, 210/321.88, 321.9, 345, 232–238, 321.69

See application file for complete search history.

(56) References Cited

U.S. PATENT DOCUMENTS

| | | | |
|---|---|---|---|
| 5,182,019 | A | 1/1993 | Cote et al. |
| 6,325,928 | B1 | 12/2001 | Pedersen et al. |
| 6,632,358 | B1 | 10/2003 | Suga et al. |
| 2002/0179517 | A1* | 12/2002 | Pedersen .................... 210/321.8 |
| 2003/0038075 | A1 | 2/2003 | Akimoto et al. |
| 2005/0161389 | A1 | 7/2005 | Takeda |
| 2006/0118477 | A1 | 6/2006 | Pedersen |
| 2007/0163942 | A1 | 7/2007 | Tanaka et al. |
| 2010/0258492 | A1* | 10/2010 | Kang et al. .................... 210/232 |

FOREIGN PATENT DOCUMENTS

| | | |
|---|---|---|
| CN | 1392802 A | 1/2003 |
| CN | 1289268 A | 10/2003 |
| CN | 1830837 A | 9/2006 |
| DE | 10004863 A1 | 2/2001 |
| GB | 2 135 902 A | 9/1984 |
| JP | 61/802 | 1/1986 |
| JP | 61-234905 | 10/1986 |
| JP | 1-500649 A | 3/1989 |
| JP | 09099222 A * | 4/1997 |
| JP | 11-309331 | 11/1999 |
| JP | 2000-157847 A | 6/2000 |
| JP | 2002-542013 | 12/2002 |
| JP | 2003-24751 A | 1/2003 |
| JP | 2003-117354 A | 4/2003 |

| | | | |
|---|---|---|---|
| JP | 2008259978 A | 10/2008 | |
| WO | WO 02/094421 A1 | 11/2002 | |
| WO | WO 2004/078326 A2 | 9/2004 | |
| WO | WO-2005118116 A1 | 12/2005 | |
| WO | WO-2007083723 A1 | 7/2007 | |

OTHER PUBLICATIONS

Supplementary European Search Report dated Jun. 12, 2012, application No. EP08871805.
International Search Report dated Apr. 21, 2009, application No. PCT/JP2008/073533.
Singapore Application Serial No. 2010055176, Search Report mailed Oct. 6, 2011, 6 pgs.
Singapore Application Serial No. 2010055176, Written Opinion mailed Oct. 6, 2011, 6 pgs.
Austrian Search Report dated Oct. 9, 2012, application No. GCC/P/2009/12761.
Chinese Office Action dated Aug. 2, 2012, application No. 200880125722.2 with English translation of First Office Action.
Office Action issued on Apr. 17, 2013, in Chinese Patent Application No. 200880125722.2.

* cited by examiner

*Primary Examiner* — David C Mellon
(74) *Attorney, Agent, or Firm* — RatnerPrestia

(57) ABSTRACT

A membrane filtration apparatus is provided in which a hollow fiber membrane element 1 including a water collecting cap 20 having a water collecting port and a groove and being engaged liquid-tightly with a bundle of a hollow fiber membrane is engaged with a frame 60 having supporting beams 65 to be fitted in the grooves. The engagement and the rotation of the hollow fiber membrane element 1 is possible merely by inserting the supporting beams 65 into the grooves formed in the water collecting cap 20.

9 Claims, 7 Drawing Sheets

HOLLOW FIBER MEMBRANE ELEMENT, FRAME FOR HOLLOW FIBER MEMBRANE ELEMENT, AND MEMBRANE FILTRATION APPARATUS

CROSS REFERENCE TO RELATED APPLICATIONS

This application is a U.S. National Phase Application of PCT International Application No. PCT/JP2008/073533, filed Dec. 25, 2008, which claims priority to Japanese Patent Application No. 2008-020710, filed Jan. 31, 2008, the contents of these applications being incorporated by reference herein in their entirety.

FIELD OF THE INVENTION

The present invention relates to a membrane filtration apparatus which is immersed in a septic tank containing sewage and filters the sewage. More particularly, it relates to a membrane filtration apparatus in which a water collecting cap of a hollow fiber membrane element having bundled hollow fiber membranes is provided with a groove for engagement with an element supporting member, and the groove is engaged with a beam of the element supporting member, thereby facilitating detachment of the hollow fiber membrane element.

BACKGROUND OF THE INVENTION

In general, a membrane filtration apparatus of an immersion type using a hollow fiber membrane is used in such manner that the membrane filtration apparatus is immersed in a septic tank, and suction-filters sewage containing suspended substances through a hollow fiber membrane, thereby providing filtered water.

The hollow fiber membrane is often used by bundling a large number of hollow fiber membranes in thread form to provide a cylindrical cartridge. In the cartridge, a large number of the hollow fiber membranes are bundled, one end of which is closed, and the other end of which is opened. The sewage is sucked from the open ends of the hollow fiber membranes to provide filtered water through the hollow fiber membranes.

The water collecting efficiency of the membrane filtration apparatus is proportional to the suction power. For increasing the water collecting amount, it is effective to immerse a large number of the cartridges in the septic tank. This is because a large water collecting amount can be obtained by using a large number of the cartridges simultaneously even though the water collecting amounts of the individual cartridge are small.

Patent Document 1 discloses a filtration apparatus, in which four filter submodules each containing hollow fiber membranes in the form of a cylindrical cartridge are fastened to provide a unit, and a plurality of units are stacked and fixed to a frame. In the filtration apparatus, the upper parts of the four filter submodules are fixed liquid-tightly to one manifold. A water collecting tube is engaged with the manifold, and filtered water from four filter submodules can be collected from one manifold.

A large number of the units containing four filter submodules are aligned to fabricate one membrane filtration apparatus.

There is a problem that the suspended substances in the sewage are attached to the hollow fiber membrane to decrease the filtration efficiency. Accordingly, a diffuser is provided at the lower part of the filter submodules, and air is applied to the modules periodically. The suspended substances attached to the hollow fiber membranes are detached and removed with the air. The process is referred to as air scrubbing.

Patent Document 1: JP-T-2002-542013

SUMMARY OF THE INVENTION

The manifold for fixing a plurality of filter submodules has a locking mechanism and a clipping member, thereby making the filter submodules detachable. This is because the manifold and the filter submodule are engaged liquid-tightly, whereas the filter submodule is exchanged since it is unavoidably deteriorated by aging. Furthermore, since the filter submodule immersed in the septic tank is significantly heavy, the manifold and the filter submodule are engaged firmly for pulling up the filter submodules along with the manifolds fixed to the frame from the septic tank.

However, the manifold and the filter submodules, which have been immersed in the septic tank for a prolonged period of time, are difficult to be detached from each other, which provides difficulty on exchanging the filter submodule.

The invention provides such a hollow fiber membrane element that can be engaged liquid-tightly with the water collecting tube, and can be fixed firmly to the frame upon pulling up from the septic tank, but can be easily detached therefrom upon exchanging, thereby facilitating the exchanging operation.

Namely, the hollow fiber membrane element of an embodiment of the invention has bundled hollow fiber membranes that is engaged liquid-tightly with a water collecting cap having a water collecting port, and the water collecting cap is provided with a groove for engaging with a supporting beam provided on a frame.

The invention also provides a frame having a supporting beam for engaging with the hollow fiber membrane element having a water collecting cap with a groove. The invention further provides a membrane filtration apparatus optionally having the hollow fiber membrane element having a water collecting cap with a groove, which is engaged with the supporting beam of the frame.

The hollow fiber membrane element of an embodiment of the invention has a water collecting cap with a groove which is engaged liquid-tightly with a hollow fiber membrane, whereby the hollow fiber membrane element can be fixed to the frame by engaging the groove with the supporting beam of the frame. In particular, the groove of the water collecting cap may be provided in the horizontal direction and may be engaged with the supporting beam extending horizontally from the frame, thereby providing high load resistance in the vertical direction. Accordingly, the hollow fiber membrane element can be easily pulling up from the septic tank upon exchanging the element.

Further, the hollow fiber membrane element of an embodiment of the invention is fixed to the frame by simply engaging the groove provided on the water collecting cap with the supporting beam of the frame, whereby the element can be easily detached from the frame.

The water collecting cap and the frame are engaged with each other, whereby the water collecting port and the water collecting tube can be connected to each other by fastening an ordinary ferrule structure with a clamp.

The frame of an embodiment of the invention has a supporting beam for retaining a hollow fiber membrane element. The supporting beam may be such a beam capable of being engaged with the groove of the water collecting cap. The frame may be in a linear shape as long as an intended strength can be obtained, whereby the frame can be easily produced.

The membrane filtration apparatus of an embodiment of the invention has the hollow fiber membrane element and the frame, whereby the apparatus can be easily produced, and the hollow fiber membrane element can be easily exchanged.

Figure 1:
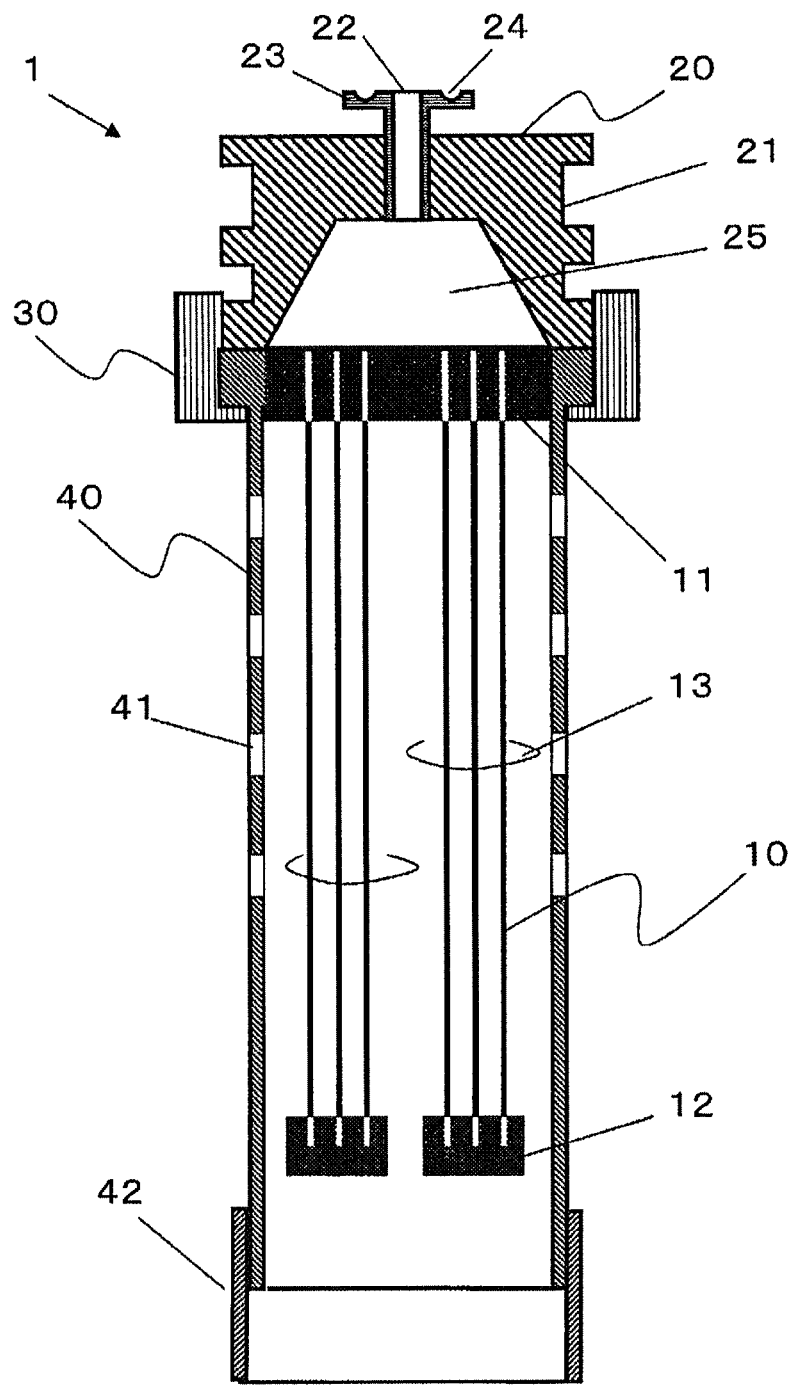
FIG. 1 is a cross sectional view showing an embodiment of the hollow fiber membrane element according to aspects of the invention.

DESCRIPTION OF REFERENCE NUMERALS 1 hollow fiber membrane element
3 membrane filtration apparatus
10 hollow fiber membrane
20 water collecting cap
21 groove
22 water collecting port
27 rib
30 cap nut
40 cylindrical case
60 frame
70 water collecting tube
75 diffuser

DETAILED DESCRIPTION OF THE INVENTION

Embodiments of the invention will be described with reference to the drawings. FIG. 1 is a cross sectional view showing an embodiment of the hollow fiber membrane element according to aspects of the invention. The hollow fiber membrane element 1 contains hollow fiber membranes 10 and a water collecting cap 20, and may further contain a cap nut 30 and a cylindrical case 40.

From 50 to 2,000 threads of the hollow fiber membranes 10 are bundled into one unit bundle 13, and one end thereof is closed with a hollow fiber membrane closing member 12. The unit bundles 13 are fixed to a hollow fiber membrane fixing member 11 at the end opposite to the end that has been closed with the hollow fiber membrane closing member 12. The hollow fiber membrane fixing member 11 bundles the plurality of unit bundles 13 into one bundle and fixes the hollow fiber membranes 10 with open ends. Accordingly, one hollow fiber membrane 10 is in a pouch form.

The material for the hollow fiber membranes is not particularly limited, and a hollow fiber having membrane permeability may be used. Examples of the material for the hollow fiber membranes include polysulfone, polyethersulfone, polyacrylonitrile, polyimide, polyetherimide, polyamide, polyether ketone, polyether ether ketone, polyethylene, polypropylene, an ethylene-propylene copolymer, cellulose, cellulose acetate, polyvinylidene fluoride, an ethylene-tetrafluoroethylene copolymer, polytetrafluoroethylene and a composite material of these materials.

The water collecting cap 20 has in the body thereof a manifold 25, a water collecting port 22 and a groove 21. The water collecting cap 20 is engaged liquid-tightly with the hollow fiber membranes 10, and the method for engaging is not particularly limited. In the embodiment shown in FIG. 1, the hollow fiber membranes 10 are once fixed with the hollow fiber membrane fixing member 11, and are then engaged liquid-tightly with the inner wall of the cylindrical case 40. The cylindrical case 40 and the water collecting cap 20 are fastened with the cap nut 30, thereby engaging liquid-tightly the hollow fiber membranes 10 with the water collecting cap 20.

The water collecting port 22 is a through hole penetrating the manifold 25 of the water collecting cap 20 toward the exterior, and filtered water obtained by filtering the sewage through the hollow fiber membranes 10 can be obtained through the manifold 25 by sucking from the water collecting port 22.

The water collecting port 22 has a connecting unit for connecting with a pipe connected to the water collecting tube. The connecting unit is provided for separating the water collecting port 22 and the water collecting tube upon exchanging the hollow fiber membrane element 1. The connecting unit is not particularly limited, and any member that can connect liquid-tightly may be used.

In the embodiment shown in FIG. 1, a ferrule joint 23 is used as the connecting unit provided on the water collecting port 22. The ferrule joint 23 has a joint in a flange form having a dent 24 for a gasket formed on the surface thereof. The ferrule joint 23 is connected with another ferrule joint having the same shape, while interposing a gasket therebetween, and the assembly is fastened with a clamp to provide a liquid-tight connection easily.

In the hollow fiber membrane element 1, the connecting unit provided on the water collecting port 22 is free of load since the entire weight of the element is retained with the groove 21. Accordingly, the connecting unit may not have elongation or resistance to load as far as the liquid-tight state can be maintained.

Figure 2A:
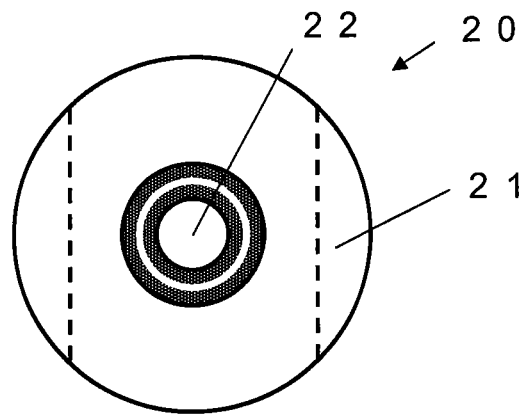
FIG. 2 are each a plan view showing the water collecting cap 20 viewed from the side of the ferrule joint 23.

The groove 21 is formed on the outer periphery of the water collecting cap 20. FIG. 2(a) is a plan view showing the water collecting cap 20 viewed from the side of the ferrule joint 23. The grooves 21 are formed in parallel to each other with the water collecting port 22 intervening between them. In other words, FIG. 2(a) shows an embodiment having grooves 21 provided at a plurality of positions on the outer periphery of the water collecting cap 20, in this case, two positions which are axisymmetrical with respect to the median line of the water collecting cap in the horizontal direction (i.e., in the vertical direction in the figure).

Figure 2B:
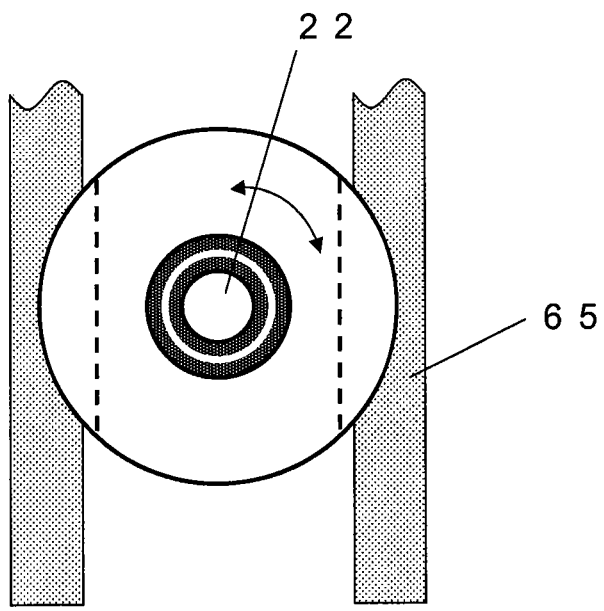

A supporting beam 65 of a frame 60 is inserted into the groove 21 (see FIG. 6), and the water collecting cap 20 is engaged with the supporting beam 65 by interfitting the supporting beam 65 to the groove 21 (see FIG. 2(b)). In this case, the grooves 21 are formed axisymmetrically with respect to the median line of the water collecting cap 20 in the horizontal direction (i.e., in the vertical direction in the figure), whereby the water collecting cap 20 is restricted in rotational movement by inserting the supporting beams 65 in parallel to each other into the grooves 21, and thus a pipe 71 between the water collecting port 22 and the water collecting tube 70 can be prevented from being damaged.

It is thus more preferred that the grooves 21 of the water collecting cap 20 not only engage the hollow fiber membrane element 1 with the supporting beams 65 of the frame 60, but also restrict the element in rotational movement. FIG. 3 are plan views showing other embodiments of the grooves 21 of the water collecting cap 20. The form of the grooves 21 is not limited to these embodiments.

Figure 3A:
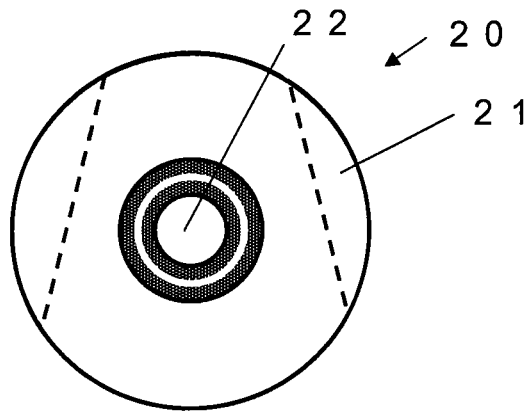
FIG. 3 are plan views showing other embodiments of the grooves 21 of the water collecting cap 20.

FIG. 3(a) shows the embodiment that the grooves 21 are formed in the form of a folding fan, i.e., grooves 21 are provided at a plurality of positions, in this case, two positions, on the outer periphery of the water collecting cap 20. In this embodiment, it is more preferred that the supporting beams 65 of the frame have the same configuration.

Figure 3B:
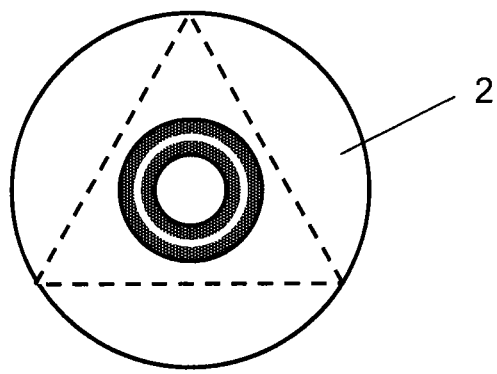

FIG. 3(b) shows the embodiment that the grooves 21 are formed in the triangular form that is axisymmetrical with respect to the median line of the water collecting cap 20 in the horizontal direction (i.e., in the vertical direction in the figure). In this embodiment, it is preferred that the supporting beams 65 are in the form of a folding fan.

Figure 3C:
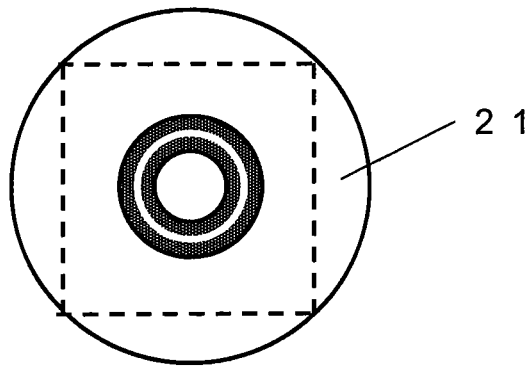

FIG. 3(c) shows the embodiment that the grooves 21 are formed in the rectangular form. In other words, two pairs of parallel grooves are formed perpendicularly, i.e., the grooves 21 are formed on the entire outer periphery of the water collecting cap 20, and the grooves 21 are axisymmetrical with respect to the median line of the water collecting cap 20 in the horizontal direction (i.e., in the vertical direction in the figure).

Figure 4A:
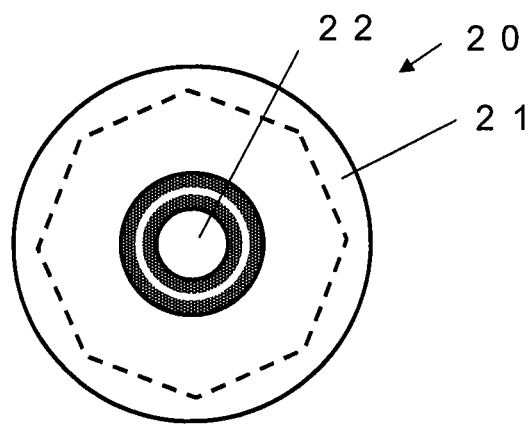
FIG. 4 are plan views showing other embodiments of the grooves 21 of the water collecting cap 20.

FIG. 4(a) shows the embodiment that the grooves 21 are formed in the hexagonal form. The grooves 21 may be formed in a polygonal form, and in this case, the grooves 21 are formed on the entire outer periphery of the water collecting cap 20, and the grooves 21 are axisymmetrical with respect to the median line of the water collecting cap 20 in the horizontal direction (i.e., in the vertical direction in the figure).

Figure 4B:
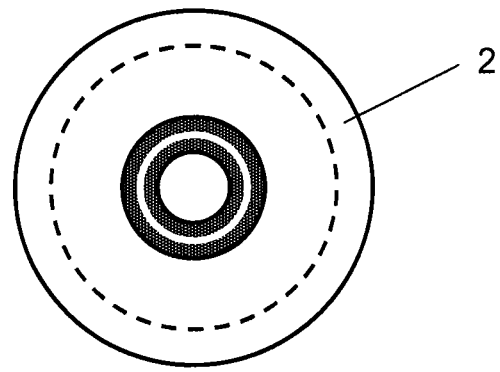

FIG. 4(b) shows the embodiment that the grooves 21 are formed in the circular form. A groove 21 in a circular form or an arc form is not excluded from the hollow fiber membrane element 1. In this embodiment, however, the water collecting cap 20 may be deviated in the circumferential direction in some cases, and therefore, it is preferred that the supporting beam 65 of the frame 60 has means capable of restricting the water collecting cap 20 in rotational movement.

The groove 21 preferably has such a strength that withstands not only the load of the hollow fiber membrane element 1 containing sewage, but also water flow caused by charging and discharging sewage in the septic tank. Accordingly, the structure, shape and position of the groove 21 on the water collecting cap 20 are determined in consideration of not only the load applied vertically to the hollow fiber membrane element 1, but also the load applied horizontally thereto.

Figure 5:
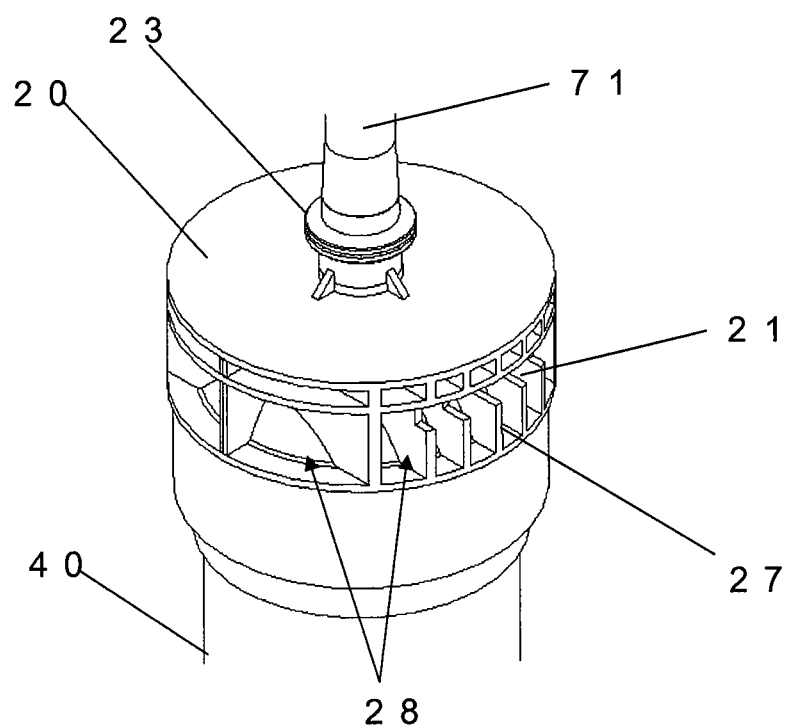
FIG. 5 is a perspective view showing a water collecting cap 20.

FIG. 5 is a perspective view showing a water collecting cap 20. The water collecting cap 20 has a water collecting port at the upper part thereof, which is connected to the pipe 71 extending from the water collecting tube 70 with the ferrule joint 23. The water collecting cap 20 is liquid-tightly connected to the cylindrical case 23. The water collecting cap 20 has the groove 21 on the side wall thereof. A rib 27 may be provided on the part where the groove 21 is formed.

The water collecting cap 20 may be formed of a resin material, and it is often the case that the diameter of the water collecting cap 20 is from more than 100 mm to about several hundreds millimeters. In the case where the water collecting cap 20 has a thick part, the shape thereof is not suitable for injection molding. Also, the weight thereof becomes excessively heavy when it is produced by cutting process. Therefore, a lightening cutout 28 may be provided in the water collecting cap 20. In this case, it is preferred to provide the rib 27 for reinforcing the part provided with the groove 21.

As shown in FIG. 1, the cylindrical case has an opening 41 on the side wall thereof and has an air introducing cylinder 42 at the lower part thereof. A diffuser is provided under the air introducing cylinder 42, and air introduced into the cylindrical case 40 through the air introducing cylinder 42 sways the hollow fiber membranes 10 while uprising, and exits from the opening 41. The suspended substances attached to the surface of the hollow fiber membranes 10 are detached from the surface by being swayed with the air, thereby maintaining the filtration efficiency of the hollow fiber membranes 10.

The position of the opening 41 is preferably that 75% or more in terms of opening area of the openings 41 are provided in the upper half region in the vertical direction (vertical direction in FIG. 1) of the cylindrical case 40, and more preferably 100% of the openings 41 are provided in the upper half region of the cylindrical case 40. In the case where the openings 41 are provided in a larger amount in the lower half region of the cylindrical case 40, a part of the air does not upraise in the cylindrical case 40 and exits through the openings 41 in the lower half area to fail to sway the hollow fiber membranes 10, thereby deteriorating the efficiency of detaching the suspended substances from the surface of the hollow fiber membranes 10.

The cap nut 30 fastens the water collecting cap 20 and the cylindrical case 40 by enclosing the part where they are in contact with each other. The hollow fiber membrane element 1 is exchanged along with the water collecting cap 20 and the hollow fiber membranes 10 integrated therewith, and therefore, in the case where the hollow fiber membranes 10 and the cylindrical case 40 are integrated with each other, the water collecting cap 20 and the cylindrical case 40 may be joined by adhesion or welding.

The cap nut 30, the cylindrical case 40, the water collecting cap 20 and the air introducing cylinder 42 are each generally produced with a resin. Examples of the resin for forming these members include a polyolefin resin, such as polyethylene, polypropylene and polybutene, a fluorine resin, such as polytetrafluoroethylene (PTFE), a perfluoroalkoxyalkan (PFA), a tetrafluoroethylene-hexafluoropropylene copolymer (FEP), an ethylene-tetrafluoroethylene copolymer (ETFE), polychlorotrifluoroethylene (PCTFE), an ethylene-chlorotrifluoroethylene copolymer (ECTFE) and polyvinylidene fluoride (PVDF), a chlorine resin, such as polyvinyl chloride and polyvinylidene chloride, a polysulfone resin, a polyethersulfone resin, a polyallylsulfone resin, a polyphenylether resin, an acrylonitrile-butadiene-styrene copolymer resin (ABS), an acrylonitrile-styrene copolymer resin, a polyphenylene-sulfide resin, a polyamide resin, a polycarbonate resin, a polyether ketone resin, and a polyether ether ketone resin, which may be used alone or as a mixture thereof.

The cap nut 30, the cylindrical case 40, the water collecting cap 20 and the air introducing cylinder 42 may be each produced with a material other than resins. Examples of the material therefor include aluminum and stainless steel. These members may also be produced with a composite material, such as a composite material of a resin and a metal, glass fiber-reinforced plastics and carbon fiber-reinforced plastics. The cylindrical case 40, the water collecting cap 20 and the air introducing cylinder 42 may be produced with the same material or different materials.

The water collecting port 22 of the hollow fiber membrane element 1 is connected liquid-tightly to the pipe 71 connected to the water collecting tube 70 provided on the frame 60, and the hollow fiber membrane element 1 is retained at the prescribed position by engaging the supporting beam of the frame with the groove 21, and then immersed in the septic tank. The water collecting tube 70 is connected to a negative pressure pump, with which the sewage outside the hollow fiber membranes 10 is sucked through the manifold into the interior of the membranes. The suspended substances in the sewage are filtered with the hollow fiber membranes 10, and filtered water is sent from the manifold to the water collecting tube 70 through the water collecting port.

After completing the filtering process in the prescribed period of time, the suspended substances accumulated on the hollow fiber membranes 10 are detached by reverse cleaning where filtered water or compressed air is sent from the water collecting cap 20 to the side of the sewage, or by air scrubbing where compressed air is fed from the diffuser provided under the hollow fiber membrane element 1.

In the reverse cleaning, since filtered water or compressed air flows from the interior to the exterior of the hollow fiber membrane, the suspended substances attached to the outer surface of the hollow fiber membrane is detached or is in a state where the substances are liable to be detached. The substances are then detached by air scrubbing and accumulated on the bottom of the septic tank.

Figure 6:
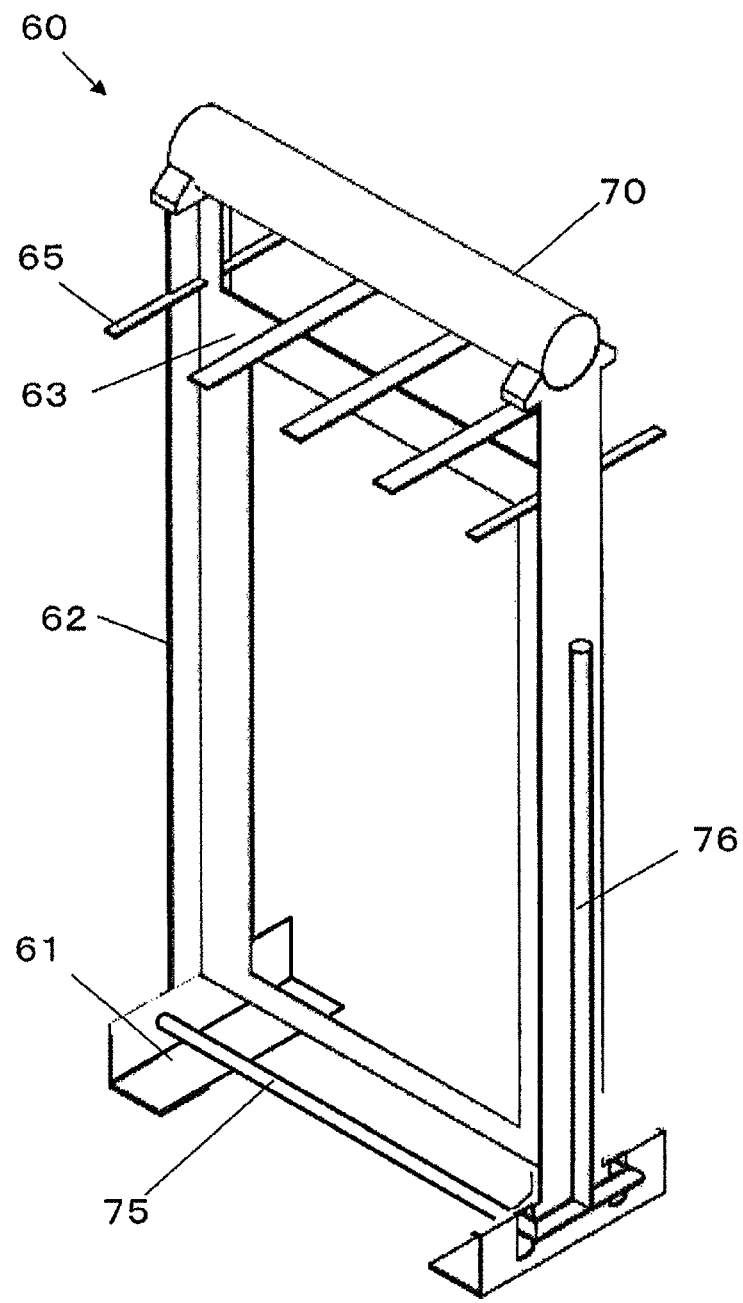
FIG. 6 is a perspective view showing an embodiment of the frame 60 that retains the hollow fiber membrane element 1.

FIG. 6 is a perspective view showing an embodiment of the frame 60 which retains the hollow fiber membrane element 1. The frame 60 has a base 61, columns 62 and a plurality of parallel supporting beams 65. The base 61 is connected to the columns 62. The columns 62 are fixed to each other with a girder 63, and the frame maintains the shape thereof with the base 61, the columns 62 and the girder 63.

The supporting beams 65 are to be engaged with the hollow fiber membrane element 1. The supporting beams 65 may have each such a shape that is capable of being engaged with the groove 21 provided in the water collecting cap 20 of the hollow fiber membrane element 1.

The frame and the supporting beams 65 may be fixed by any method without particular limitation, and in the embodiment shown in FIG. 6, for fixing the parallel supporting beams 65 firmly, the supporting beams 65 is fixed to the girder 63 between the columns.

A water collecting tube 70 and a diffuser 75 may be provided in the frame 60. The water collecting tube 70 is a tube for collecting filtered water from the hollow fiber membrane element 1 and discharging the filtered water outside. A pipe 76 is for feeding air to the diffuser 75, only a part of which is shown in the figure, and is used for feeding air from the exterior of the septic tank. The diffuser 75 feeds air from the lower side of the hollow fiber membrane element 1 to perform air scrubbing for detaching the suspended substances accumulated on the surface of the hollow fiber membranes 10. For attaining stable operation, it is preferred that the diffuser 75 is positioned under the hollow fiber membrane element 1 with less relative positional change with respect to the hollow fiber membrane element 1. Accordingly, the diffuser 75 is preferably resistant to deformation and is preferably produced with steel or a rigid resin. The diffuser 75 is more preferably produced with stainless steel, or a metal or an alloy equivalent thereto since it is immersed in the septic tank for a prolonged period of time.

The diffuser 75 has hole (which is not shown in the figure) for feeding air. The hole is positioned at substantially the center of the hollow fiber membrane element 1 on the horizontal plane, and at least one hole is provided for one hollow fiber membrane element 1. Since the air diffusing operation is performed for detaching the suspended substances accumulated on the hollow fiber membranes 10, the position of the hole is not limited to the above, and the position and the number of holes may be appropriately controlled in such a manner that the suspended substances can be removed efficiently with a small air feeding amount, in consideration of such conditions as the shape of the septic tank and the properties of the sewage.

The frame 60 is preferably produced with a metal for retaining the hollow fiber membrane element 1, and is more preferably produced with stainless steel, or a metal or an alloy equivalent thereto since it is immersed in the septic tank for a prolonged period of time.

The supporting beam 65 is also preferably produced with stainless steel, or a metal or an alloy equivalent thereto taking corrosion resistance into consideration. The supporting beam 65 preferably has such a strength that withstands not only the load of the hollow fiber membrane element 1 containing sewage, but also the load generated by water flow caused by charging and discharging sewage in the septic tank, for preventing breakage or deformation thereof that precludes practical use. Accordingly, the structure and the shape of the supporting beam 65 are determined in consideration of the weight and the number of the hollow fiber membrane elements 1, the capacity of the septic tank, and the load applied to the hollow fiber membrane elements 1 generated by water flow caused by charging and discharging sewage.

Figure 7:
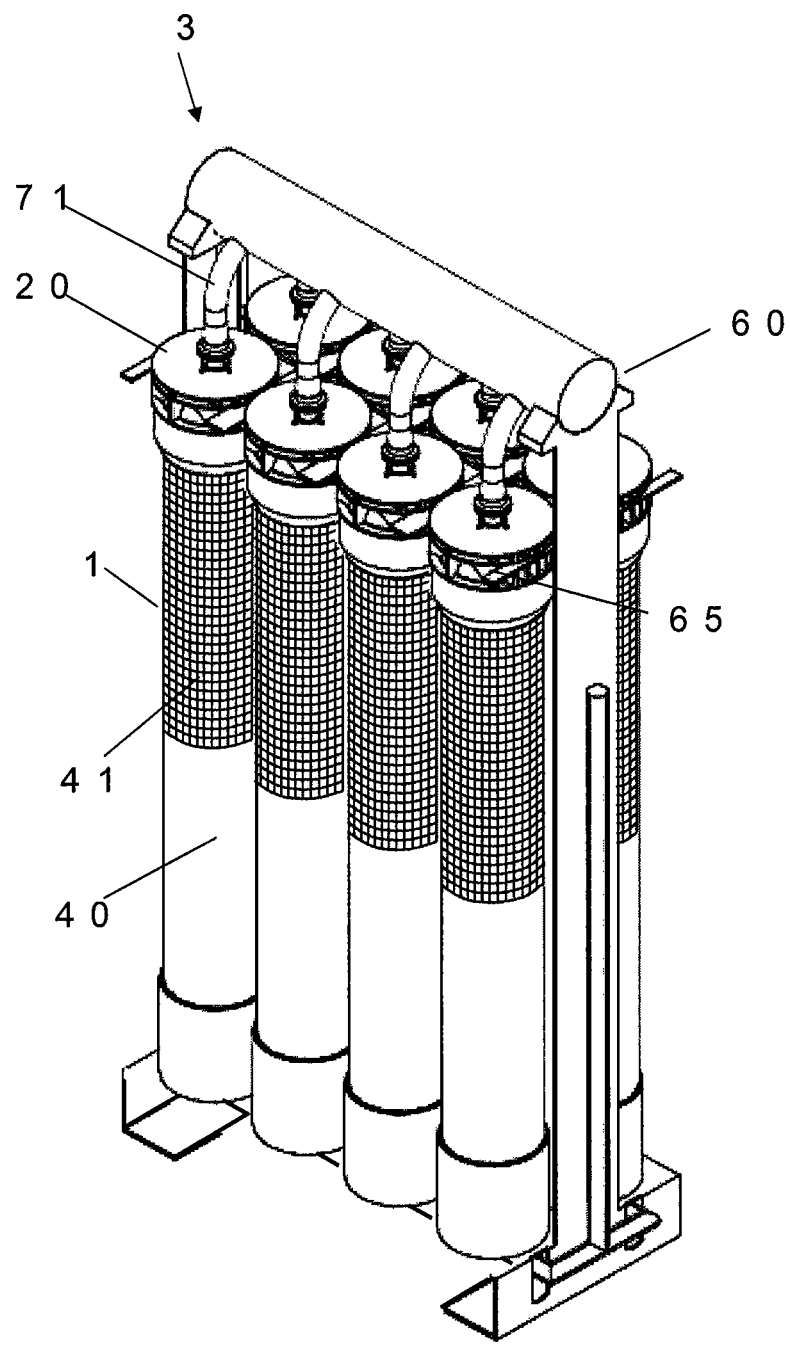
FIG. 7 is a perspective view showing an embodiment of a membrane filtration apparatus 3 containing a frame 60 having engaged therein the hollow fiber membrane elements 1.

FIG. 7 is a perspective view showing an embodiment of a membrane filtration apparatus 3 containing the frame 60 having engaged therein the eight hollow fiber membrane elements 1 in two columns and four rows. The column herein means the direction perpendicular to the longitudinal direction of the supporting beam 65, and the row means the longitudinal direction of the supporting beam 65. The hollow fiber membrane elements 1 are each engaged by interfitting the supporting beam 65 of the frame 60 to the groove 21 provided in the water collecting cap 20. In the embodiment shown in FIG. 7, two hollow fiber membrane elements are engaged with each of the three supporting beams 65 except for the supporting beams 65 at both ends thereof in the direction perpendicular to the longitudinal direction of the supporting beam 65, i.e., in the column direction, and accordingly, eight supporting beams are not necessary for engaging four elements. Namely, each hollow fiber membrane element is disposed at each space defined between the adjacent supporting beams in the direction perpendicular to the longitudinal direction of the supporting beam and is engaged with the adjacent supporting beams. As described above, the hollow fiber membrane elements 1 engaged with the frame 60 are each connected from the water collecting port to the water collecting tube through the pipe 71.

In the embodiment shown in FIG. 7, two hollow fiber membrane elements 1 are engaged in the longitudinal direction of the supporting beam 65, i.e., the row direction, in addition to the column direction. Namely, each two hollow fiber membrane elements are engaged with the supporting beam in the longitudinal direction of the supporting beam. In the embodiment shown in FIG. 7, eight hollow fiber membrane elements 1 are engaged with the frame 60, but it is not necessary to engage all the eight hollow fiber membrane elements 1, and for example, seven hollow fiber membrane elements 1 may be engaged therewith. In the case where, for example, seven hollow fiber membrane elements 1 are engaged with the frame 60, the positions of the supporting beams 65 which are engaged with the hollow fiber membrane elements 1 are not particularly limited. The number of the hollow fiber membrane elements 1 which are engaged with one frame 60 is not particularly limited, and may be determined in consideration of the size of the membrane filtration apparatus 3 to be produced.

Since the supporting beam 65 is simply inserted into the groove of the water collecting cap 20, the hollow fiber element 1 can be easily engaged with the frame 60. Even when a rotational force is applied to the hollow fiber membrane element 1, the hollow fiber membrane element 1 is not rotated since the supporting beams 65 hold the water collecting cap 20 to restrict the mounting position thereof.

The lower part of the hollow fiber membrane element 1 may be fixed to the frame 60. However, the hollow fiber membrane element 1 does not have significantly high dimensional accuracy since it is a fabricated product and most parts thereof are made with a resin. Accordingly, in the case where the hollow fiber membrane element 1 is fixed not only at the water collecting cap but also at the lower part thereof to restrict the position of the lower part, there may be trouble for adjustment upon fixing. Therefore, in the case where the hollow fiber membrane element 1 is retained by other measures in addition to the engagement using the groove according to aspects of the invention, it is preferred to restrict auxiliary the position of the hollow fiber membrane element 1 at the upper part rather than the lower part.

The present invention can be favorably applied to production of a hollow fiber membrane element and a membrane filtration apparatus produced therewith that are used for purifying surface water, such as river water and lake water, purifying groundwater, purifying sewage water or waste water formed in production factories, restaurants, seafood processing factories and food factories, in a septic tank.

The invention claimed is:

1. A membrane filtration apparatus comprising:
    a hollow fiber membrane element having a plurality of hollow fiber membranes with an upper end and a lower end, a hollow fiber membrane fixing member which bundles and fixes upper parts of the plurality of hollow fiber membranes and leaves the upper ends open, a hollow fiber membrane closing member which bundles and fixes lower parts of the plurality of hollow fiber membranes and closes the lower ends, and a water collecting cap which is engaged liquid-tightly with the hollow fiber membrane fixing member, the water collecting cap has a water collecting port and grooves formed on an outer periphery thereof; and
    a frame for a hollow fiber membrane element which supports the hollow fiber membrane element of the membrane filtration apparatus, the frame comprising a plurality of supporting beams in parallel to each other, at a part to be engaged with the hollow fiber membrane element;
    wherein the grooves of the hollow fiber membrane element are engaged with at least one of the supporting beams of the frame for a hollow fiber membrane element, and
    wherein the water collecting port includes a hollow part having a central axis that extends in a direction parallel to liquid flow through the water collecting port and perpendicular to a directional axis of the grooves and the central axis is positioned between the grooves.

2. The membrane filtration apparatus according to claim 1, comprising a plurality of the hollow fiber membrane elements attached to the frame, and each hollow fiber membrane element is disposed in a space defined between adjacent supporting beams and is engaged with the adjacent supporting beams.

3. The membrane filtration apparatus according to claim 1, wherein a plurality of the hollow fiber membrane elements are attached to the frame, wherein each supporting beam engages at least two hollow fiber membrane elements in a longitudinal direction of the supporting beam.

4. The membrane filtration apparatus according to claim 2, wherein a plurality of the hollow fiber membrane elements are attached to the frame, wherein each supporting beam engages at least two hollow fiber membrane elements in a longitudinal direction of the supporting beam.

5. The membrane filtration apparatus according to claim 1, wherein the water collecting cap is cylindrical and said hollow fiber membrane element further comprises a cylindrical case which is engaged liquid-tightly and coaxially with the water collecting cap, and the hollow fiber membrane fixing member is engaged liquid-tightly with an inner wall of the cylindrical case.

6. The membrane filtration apparatus according to claim 5, wherein the water collecting cap further comprises a second groove provided on a common horizontal plane, but at a different position than the groove formed on the outer periphery of the water collecting cap.

7. The membrane filtration apparatus according to claim 6, wherein the groove and second groove are provided axisymmetrically with respect to an arbitrary median line on a cross section of the water collecting cap in a horizontal direction.

8. The membrane filtration apparatus according to claim 5 wherein the groove is continuous and provided around the entire outer periphery of the water collecting cap.

9. The membrane filtration apparatus according to claim 1, wherein the frame further comprises a diffuser, and the diffuser is disposed at a lower side of the hollow fiber membrane element.

* * * * *